(12) United States Patent
Moss et al.

(10) Patent No.: US 7,233,580 B2
(45) Date of Patent: Jun. 19, 2007

(54) APPARATUS AND METHOD FOR MULTIPLE PARTY COMMUNICATION SESSION

(75) Inventors: Alon Moss, Netanya (IL); Alex Tiraspolsky, Brookline, MA (US); Moshe Shavit, Lexington, MA (US)

(73) Assignee: Comverse, Ltd., Aviv (IL)

( * ) Notice: Subject to any disclaimer, the term of this patent is extended or adjusted under 35 U.S.C. 154(b) by 1162 days.

(21) Appl. No.: 10/284,193

(22) Filed: Oct. 31, 2002

(65) Prior Publication Data
US 2004/0008680 A1   Jan. 15, 2004

Related U.S. Application Data

(60) Provisional application No. 60/394,266, filed on Jul. 9, 2002.

(51) Int. Cl.
   *H04Q 11/00*   (2006.01)
   *H04L 12/16*   (2006.01)

(52) U.S. Cl. .................................... 370/260; 370/261

(58) Field of Classification Search ........ 370/259–263, 370/352–356, 389, 401, 465, 466; 379/201.01, 379/202.01, 205.01
   See application file for complete search history.

(56) References Cited

U.S. PATENT DOCUMENTS

| | | | |
|---|---|---|---|
| 2003/0063573 A1* | 4/2003 | Vandermersch | 370/260 |
| 2003/0142635 A1* | 7/2003 | Roher et al. | 370/260 |
| 2005/0084086 A1* | 4/2005 | Hesse | 379/202.01 |
| 2005/0185602 A1* | 8/2005 | Simard et al. | 370/260 |
| 2005/0226230 A1* | 10/2005 | Dorenbosch | 370/352 |
| 2006/0187861 A1* | 8/2006 | West et al. | 370/260 |
| 2006/0222155 A1* | 10/2006 | Summers et al. | 379/202.01 |
| 2006/0259755 A1* | 11/2006 | Kenoyer | 713/1 |

* cited by examiner

*Primary Examiner*—Ajit Patel
(74) *Attorney, Agent, or Firm*—Sughrue Mion, PLLC (57) ABSTRACT

A communication session support infrastructure comprises a networked packet based connection unit or gateway. The gateway includes a packet data interfacing unit for converting between protocols used by a plurality of current connecting devices in a session and a packet-based protocol so that different kinds of communication devices can connect to the session although internal session management is carried out using IP type protocols. The connection unit includes a one-to-many packet routing unit which receives packets through the interfacing unit from one of the current connecting devices in a session and routes the packets back to the interfacing unit for forwarding to each of the other current connecting devices in the session.

32 Claims, 7 Drawing Sheets

APPARATUS AND METHOD FOR MULTIPLE PARTY COMMUNICATION SESSION

RELATED APPLICATION

The present Application claims priority from the co-pending U.S. Provisional Application Ser. No. 60/394,266 filed Jul. 9, 2002; the disclosure of which is incorporated herein by reference.

FIELD OF THE INVENTION

The present invention relates to an apparatus and method for a multiple user communication session, and more particularly, but not exclusively, to a communication session which is available to users connecting over different networks.

BACKGROUND OF THE INVENTION

Multiple user sessions are well known in the telephony field in the form of what are known as conference calls. In a conference call, all users are connected to a given location, often an advanced telephone of a call originator but alternatively a location belonging to the telephone service provider. The location receives all signals and mixes them for sending to each user. Mixing of the signals has a particular disadvantage in that specific hardware is needed, thereby increasing cost. Conference calls generally require specialized telephones in order to provide the support necessary for setup of such a conference call, and therefore, it is generally more difficult to arrange a conference call from a standard telephone. The specialized telephone may require support from office private branch exchange (PBX) hardware. If office PBX hardware is being used to set up the conference call, then it may be necessary for all participants to be called from the setup location in order to activate the conference call. In any of the above cases, there is often a limit on the number of participants to the conference call. As an alternative, the hardware needed for the conference call can be provided at the exchange. In such a case, an advanced telephone is not needed for call setup, but it may be necessary for each participant in the conference to call a central location. Usually in such circumstances, the conference call is arranged in advance and the users are notified of the time and the number to call.

Another kind of multi-party communication session is that provided by standard radio connections involving a base station and mobile units, such as commonly used by taxi companies, the police, and military for example. In these cases, a single channel is reserved for the group. Each member of the group is able to speak to each other member of the group via the base station. At any given time, only a single user is allowed to speak, and all the other users are limited to listening.

Numerous variations of the above radio system allow, for example, for dispensing with the base station in favor of one of the mobile units being set as master, or in favor of a circular connection system.

Disadvantages of the mobile radio system include limited range, although the range can be extended with the use of repeaters, and a closed group of users. The base station may be limited in capacity, and in any case, each user must be supplied with a mobile unit. These disadvantages do not apply to the conference call, in which anyone who is able to connect to the central telephone number is able to participate in the call. It is further noted that dial-in conference facilities also have limits on the number of simultaneous callers.

However, the mobile radio system has a number of advantages over the conference call. The multi-party session does not have to be arranged in advance. As long as the base station is operational, any mobile unit can connect. Upon doing so, the connecting unit will be connected to any of the mobile units which are currently switched on to the appropriate channel.

A service that offers a combination of the advantages of group radio and telephone conferencing is provided by telephone networks that use the Integrated Dispatch Enhanced Network (iDEN) system of cellular technologies. The iDEN solution is not applicable to the currently widespread cellular technologies, such as GSM, because it is restricted to iDEN supporting networks only. The iDEN solution cannot support devices on any other kind of network and certainly cannot support groups that encompass more than one network.

The iDEN service is thus unable to provide cross-network functionality, meaning that participation is limited to users of the iDEN service.

SUMMARY OF THE INVENTION

It is thus an object of the present embodiments to provide a multiple user telephone communication service that is able to operate independently of the telecommunications network being used, and in particular, that is able to host users from a plurality of different networks and network types.

According to a first aspect of the present invention there is thus provided a communication session support infrastructure, which comprises a networked packet based connection unit or gateway. The gateway includes a packet data interfacing unit for converting between protocols used by current connecting devices in a session and a packet-based protocol so that any kind of communication device can connect to the session but internal session management can be carried out using IP type protocols. The connection unit includes a one-to-many packet routing unit, which receives packets through the interfacing unit from one of the current connecting devices in a session and routes the packets back for each one of a plurality of other current connecting devices in the session.

According to other aspects of the invention there are provided a corresponding method and a dedicated user client.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

The present invention involves the use of an IP gateway to obtain voice or other media data in any form from a source connection and route the data in IP packet format to a plurality of destinations. Subsequent to routing, the IP gateway may convert the IP packets to a form suitable for circuit switching or leave the IP packets in packet form, depending on the capabilities of the destination network and the receiving device. The session is based on a single IP address to which all participants connect, effectively providing a single common channel. The packets are sent to the multiple destinations using single packet multiple routing techniques, for example, by use of the class of multicast IP addresses, or alternatively, the packets may simply be duplicated for each destination. Whatever kind of single packet multiple routing technique is used, the use of IP addressing typically supports the session by setting one participant to send data packets and by setting each other participant to receive data packets therefrom.

In accordance with a preferred embodiment of the present invention, a communication session is supported in which one device is designated as talk-enabled and all other devices are designated as listeners. The talk-enabled device is able to relinquish its talk status, which may then be taken up by any of the other devices. The result is a user experience similar to that of group radio, of the kind often used by taxi firms, police, delivery firms, and in military applications.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
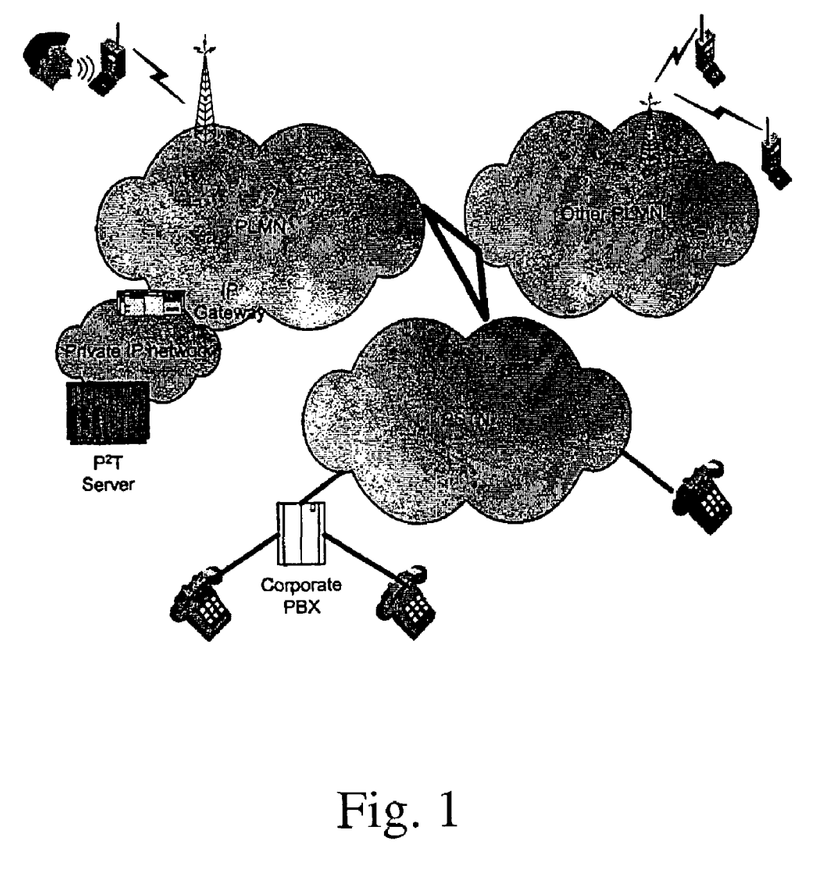
FIG. 1 is a schematic diagram showing a series of telephony users connected together over a plurality of networks via a single IP based server, in accordance with a preferred embodiment of the present invention.

Reference is now made to FIG. 1, which is a schematic diagram showing a series of telephony users connected together over a plurality of networks to a single IP based server, in accordance with the preferred embodiment of the present invention. A server 10 is designated as a $P^2T$ server, where $P^2T$ is an acronym for "phone chat: push to talk". The server 10 is connected via a private IP network 12 and a packet-based connection unit or IP gateway 14 to a first Public Land Mobile Network (PLMN) network 16. A plurality of telephony devices, such as device 17, are connected either directly to the same PLMN network, to other PLMN networks or to a PSTN network 20 and are able to connect to the server 10 via the first PLMN network 16. Individual devices are connected over different types of telephony infrastructure. Any kind or combination of telephony or communication infrastructure can be used as long as the central infrastructure, including the IP gateway 14, the private IP network 12 and the server 10, is able to manage the session and carry out activities such as single packet multiple routing. Thus, the central infrastructure may use protocols that support single packet multiple routing, an example being the TCP/IP protocol.

As shown in FIG. 1, the IP gateway 14 may be connected to PLMN 16. The PLMN 16 is connected, typically via backbone infrastructure 18, to the PSTN 20. Through the PSTN 20, connections may be made to regular telephones 22 and to typical corporate type PBX's 24 via which telephones may be indirectly connected to the PSTN. In cases where the connecting device uses a circuit switched connection, the IP gateway 14 preferably converts the received signal into packet form.

The backbone 18 may likewise further connect to a second PLMN network 26 through which mobile telephony device 28 may communicate.

The $P^2T$ control server 10 is preferably an-IP based server, and may provide the following functions:

1. Signaling control for multiple $P^2T$ session establishment, as will be described in greater detail below,
2. Control of $P^2T$ sessions flows, including serving of participant requests and detection of session end, again as will be described in greater detail below,
3. Allocation and de-allocation of multicast addresses for $P^2T$ sessions,
4. Support of interface to network address book and AAA, that is, authorization protocol, servers, and
5. Provisioning of $P^2T$ talk groups.

The server 10 preferably also has the ability to send audible signals to $P^2T$ session participants (optional), or to send signals that may be recognized in the receiving device for generation of preprogrammed audible signals.

In the following, the abbreviation CS is used to refer to circuit-switched connections, and $P^2T$ IP Gateway 14 is preferably constructed using a generic CS—to—IP network gateway that allows connectivity of a CS session to an IP multicast session.

Figure 2:
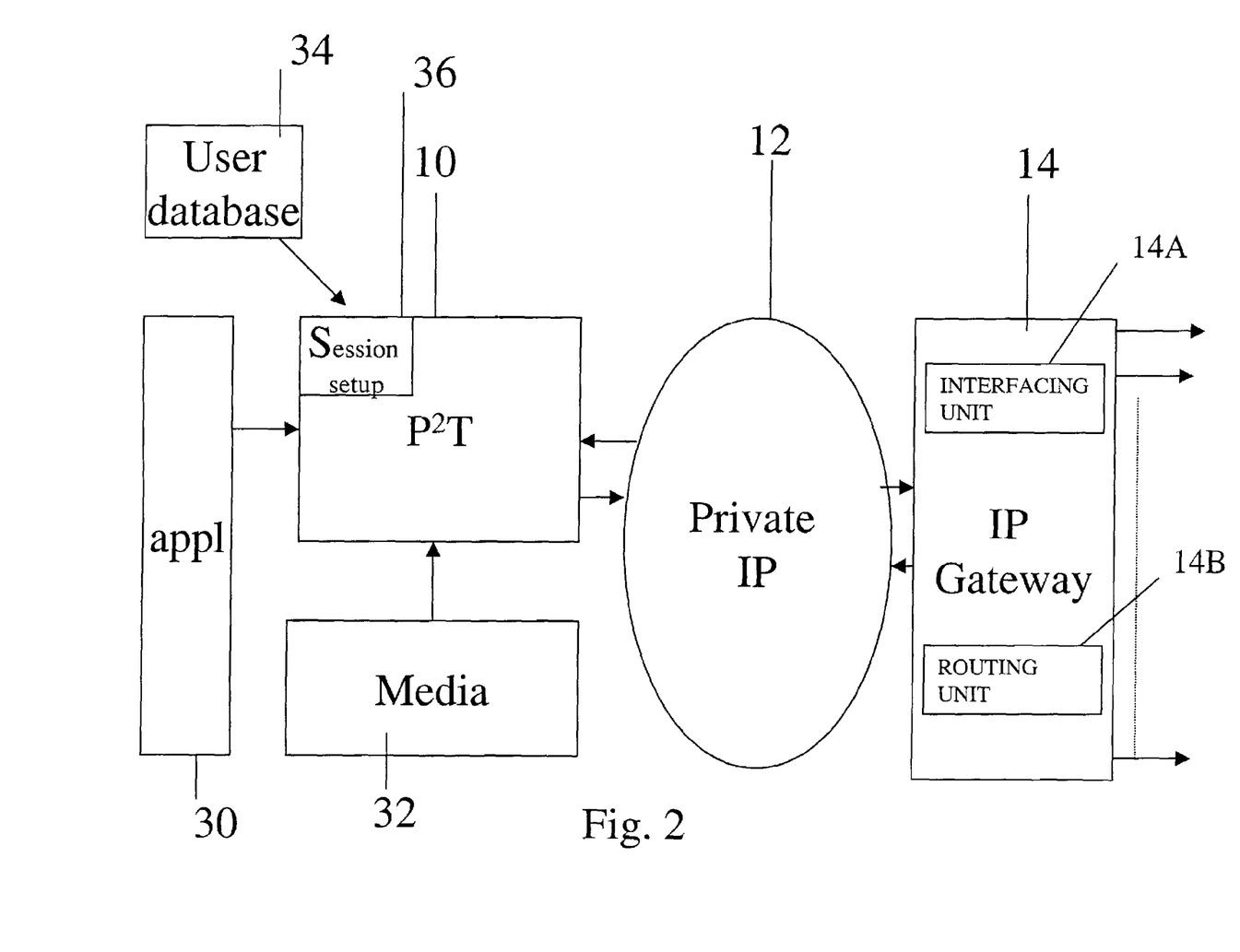
FIG. 2 is a simplified schematic diagram showing in greater detail the IP gateway and server of FIG. 1.

Reference is now made to FIG. 2, which is a simplified diagram showing in greater detail the central infrastructure part of the embodiment of FIG. 1. In FIG. 2, elements that are the same as in FIG. 1 are given the same reference numeral and are not discussed further except as necessary for an understanding of the present invention. The IP gateway 14 includes a packet data interfacing unit 14A for converting between protocols used by communication devices currently connected in a session and a packet-based protocol, and a one-to-many packet routing unit 14B for receiving packets through the interfacing unit 14A from one of the current connecting devices in the session and routing the packets back to the interfacing unit for each of the other current connecting devices in the session. The IP gateway 14 provides connections to each participating device, and the connections may be either circuit-switched or packet switched as required for the connecting device. For circuit-switched connections, the IP gateway 14 serves as a CS-IP converter, as discussed above. The IP gateway 14 is connected to the private IP network 12, which in turn is connected to the P²T server 10. The P2T server 10 supports the session, typically using applications stored in an application unit 30, and if desired, also multimedia resources stored in a media unit 32Such resources may include multimedia items, such as prompts, tones, icons etc. to indicate to a user that the user has been granted talk status, or that the session is over, or for any other purpose deemed desirable.

A user database 34 is preferably provided for providing contact information for remote devices, typically telephone numbers, and for grouping the remote devices as required by individual users. Thus, a user may define a group that the user wishes to use, for example a project team, and subsequently select the group from the database in order to establish a session. A session setup unit 36 is preferably provided as part of the P²T server 10 to manage selection of groups and group members and to send session setup alert signals to the correct group members.

Figure 3:
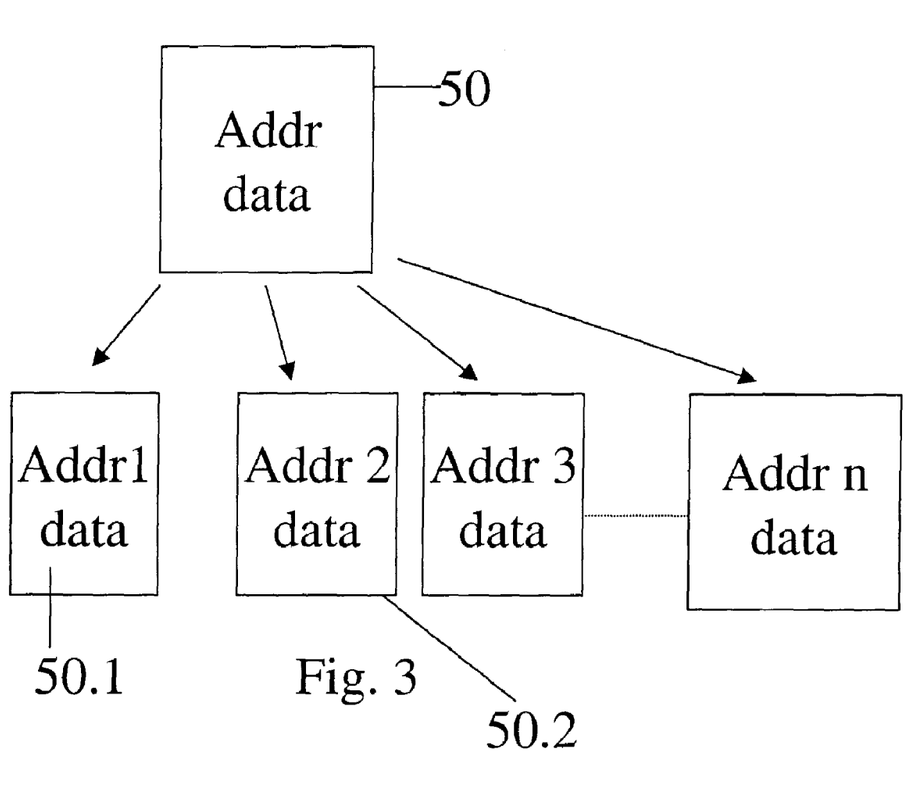
FIG. 3 is a simplified schematic diagram illustrating in parallel two embodiments for routing of packets at the IP gateway of FIG. 1.

Reference is now made to FIG. 3, which is a simplified schematic diagram showing two alternatives for providing single packet multiple routing. During the multi-party session, the IP gateway 14 preferably receives data from a currently talk-enabled communication device and sends the data to each of the other participating devices. In accordance with the preferred embodiment, the IP address used for the session is of the class of multicast IP addresses, and a single packet 40 is in fact fetched by each of the participating devices which are not currently talking, that is to say listening devices—40'. That is to say, the session is assigned a session IP address. The session IP address is of multicast type, which means that it is recognized as representing port IP addresses of each of the listening devices, and any data packet addressed to the session IP address is in fact sent to each listening device. In an alternative embodiment, a single packet 50 is duplicated separately 50.1–50.n, with different header information for each one of the participating listening devices. Such a method is known in the literature as unicast and reference is hereby made to http://www.cisco.com/warp/public/614/17.html.

Figure 4:
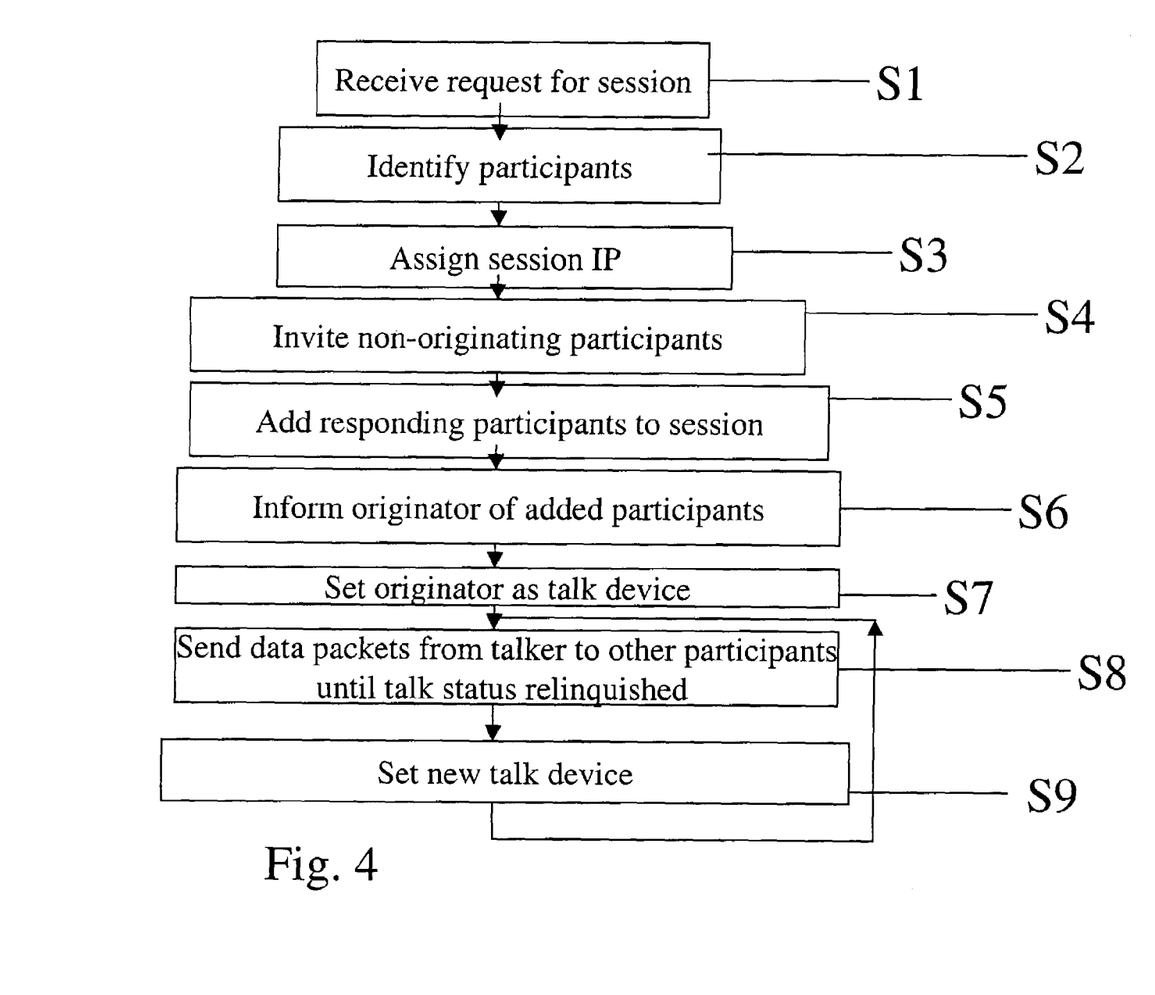
FIG. 4 is a simplified flow chart showing a method of setting up a multi-party session according to a preferred embodiment of the present invention.
Figure 5:
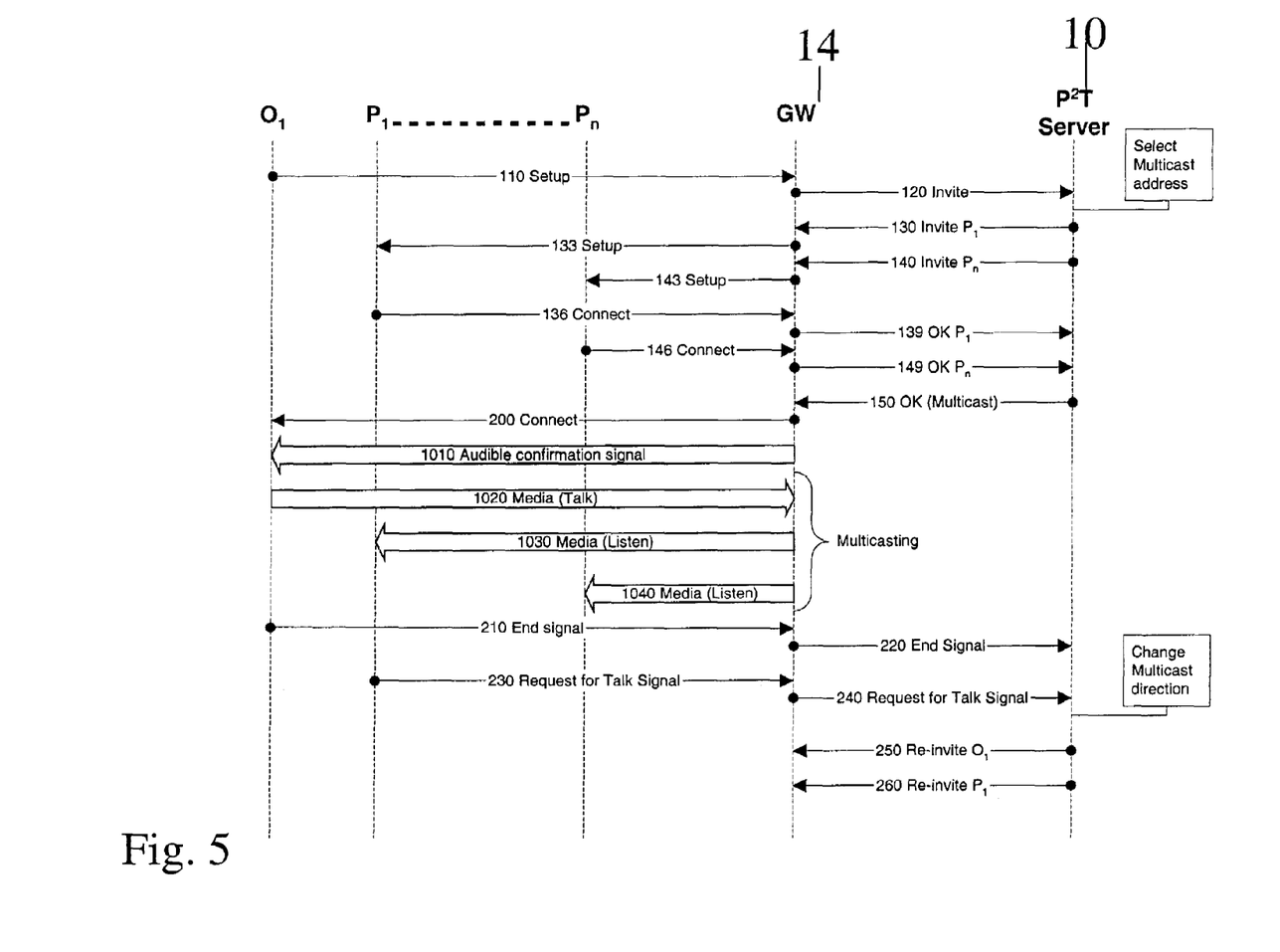
FIG. 5 is a signal diagram, showing in simplified format the setting up and management of a multi-party communication session according to the embodiment of FIG. 1.

Reference is now made to FIG. 4, which is a simplified flow chart showing the setup and management of a multi-party session according to the preferred embodiment of the present invention. In a first stage S1, a session request is received at the server 10 from an originating device. As shown in FIG. 1, all signals are in fact mediated by gateway 14, however the complex set up by the server 10 and the gateway 14, and as illustrated in FIG. 2, are considered, for ease of explanation, as a single device in the flow of events described in FIG. 4. FIG. 5 shows a practical arrangement of a flow of signals taking account of the presence of a gateway.

A session request setup signal preferably includes group identification information which enables the server 10 to identify intended session participants in stage S2. At the same time a session multicast IP address may be assigned in a stage S3. A session request setup signal, for example an invite signal of the kind discussed below in reference to FIG. 5, is sent out to all intended participants, with the exception of the originator, and responses are awaited. The IP gateway preferably extracts address information, such as the multicast IP address, from the session request setup signal. Stage S5 involves receiving responses and adding the corresponding devices to the session. Preferably a time-out is used so that the system ceases to wait beyond a predetermined interval if not all of the devices respond. For example, the devices may not respond if they are busy or switched off. In stage S6, the originator is informed that the session is set up, and possibly who the successfully added participants are.

In stage S7, the originator is set up as the initial talk enabled device and is able to send voice signals to each of the other devices in a stage S8. The voice signal sent by the originator may be circuit or packet switched, depending on the communication device being used and the type of network over which the originator is connecting. The voice signal is preferably routed in IP protocol format over the gateway 14 and then converted, if necessary, for the various other participants. As talk status is relinquished, typically either by pressing a particular button or following a time out, as explained in greater detail hereinbelow, the other devices are able to request talk status in a stage S9 and the session continues as long as at least two participants remain.

Signaling operation of the system is now explained with reference to FIG. 5, which is a simplified signaling diagram showing typical exchange of signals during a communication operative in accordance with embodiments of the present invention. A setup signal 110 is sent from a device $O_1$ wishing to set up a group communication session. The signal 110 is directed to IP gateway 14. The IP gateway 14 then sends a signal 120 to the P²T server 10. The signal is preferably a session initiation protocol (SIP) invite signal or an H323 setup signal.

The setup signal 110 preferably includes information allowing the P²T server 10 to identify an intended group for the session. The information may be a database pointer or other kind of identifier, which is preferably passed on to the server 10 in signal 120. The server 10 is preferably enabled to use the pointer to search its database for identification of the group and thereby to obtain addressing information for reaching each of the devices in the group. A validation of individual group members may optionally be carried out by contacting them to ensure that they are online. At the same time the P²T server preferably designates an IP address for the session.

The server 10 preferably deals with authentication and security issues by using the AAA protocol. The protocol permits a range of secure levels known as resolution levels and the server 10 preferably sets a desired AAA resolution level for the session. That is to say, the server 10 is able to deal with authentication issues. Subsequently, invitation signals 130–140 for each of the prospective participants in the session, $p_1-p_n$, are sent to the gateway 14. The invitations include the IP address selected for the session. The gateway 14 sends a corresponding invitation signal 133–143 onwards to each of the devices. Generally sending the invitation signal involves dialing the respective devices, and the invitation to join arrives at the device in the same way as an incoming telephone call, and may include such features as call identification if and when supported by the respective device and corresponding network.

The devices $p_1-p_n$ preferably answer the calls, 136–146, possibly automatically, by replying to the gateway 14.

In a series of signals 139–149, the IP gateway 14 signals the server 10 as to which of the devices have responded, so that they can be added to the session.

When all the call initiations have been confirmed, or if a timeout is reached first, the server 10 sends a multicast packetized signal 150 to the gateway 14 confirming call establishment and preferably also indicating the confirmed participants and the session IP address. The signal achieves this by including data, obtained from database 34, of the participating devices and the number, in the form xxx.xxx.xxx of the IP address. The signal, minus the session IP address, is preferably relayed by the gateway 14 to the initiating device $O_1$ as a connect signal 200. The IP address is not included because the system beyond the gateway is not guaranteed to be IP compatible. The intention is to allow a conferencing session that can be utilized by any telecommunication device regardless of sophistication. As mentioned above, providing participants with a list of participating devices is also optional, and if the option is not available, due to capacity limitations or due to the limitations of the device or the network on which the device is located, then the list of participants need not be included with the connect signal 200. At this point, a two-way connection is set up between the originating device O1 and the gateway 14. In effect, the session is fully set up and the gateway is now able to send a signal 1010 to indicate to the initiating device that it may begin talking. The signal 1010 is preferably an audible signal. As an alternative, the signal 1010 may simply be a connect signal 200, which activates an audible (and/or visible) indication on the device.

By now, all of the participating devices are connected to IP ports at the gateway 14 and each of the IP ports at the gateway 14 is connected to the same session IP address. The device that is talk-enabled sends voice to the IP gateway 14 which in turn sends voice data packets to the session multicast IP address 1020. The data packets are then fetched by the participating devices 1030–1040, preferably in one of the ways described above.

The talk-enabled device sends an end signal 210 back to the gateway 14 in order to relinquish talk status. The end signal may be a signal specifically generated at the device and inserted into the voice signal, such as a DTMF signal, or an out-of-band signal, or simply a certain period of silence or alternatively a digital signal. In a preferred embodiment, a combination of the above is used, that is to say, either or both of a DTMF or digital signal may be taken as an explicit end signal if received. However, if no explicit end signal is received, then an implicit end of state is assumed if a certain period of silence is measured. The end signal 210 is relayed from the gateway to the server 10 as relay signal 220, and the server 10 removes talk status from the current talk-enabled device. The server 10 is now ready to process a talk request signal from any one of the devices.

When another one of the participating devices $p_1$–$p_n$ issues a request for talk signal 230, he signal 230 is received by the gateway 14 and is relayed to the server 10. The server 10 sets the new device as the current talk-enabled device The new settings are relayed to the gateway 14 via invitation signals 250 and 260, respectively. The invitation signal 250 instructs the gateway 14 to accept data packets from the new talk enabled device and, in one preferred embodiment the invitation signal 260 instructs the gateway to stop accepting packets from the previous talk enabled device and instead to add the previous talk enabled device to the receiving devices, to which new data packets are to be sent. In another embodiment the gateway stops accepting packets from the previous talk enabled device as soon as it relinquishes its talk status. Thus, the settings defined at the server 10 are set at the gateway 14.

In use, the above-described embodiment allows a group of users, who may be users of the same or of different networks, including both mobile and fixed networks, to set up a common session. The initiator records a voice message which is sent in turn to all other users as they connect up. Any of the users can respond to the message. All members of the group hear the message and subsequent response. It will be appreciated that the embodiment differs from a conference call or conference bridge in several respects, as related in the following.

Initiation of the $P^2T$ service preferably causes the handsets of the various members of the user group to ring. In other words, $P^2T$ sessions may be created without pre-arrangement. Such creation of sessions is not feasible using conference servers, which currently require a user to dial in at a pre-arranged time, or from other kinds of conference call facilities, which require the party setting up the call to contact participants individually. The embodiment of the present invention being described merely requires that the handsets of users being invited to participate in the session are switched on, which is to say that if the handsets are not switched on then they will not ring to signal the start of the session.

As described above, this embodiment of the present invention allows one of the devices to be designated as a talk-enabled device. Other devices have to wait until talk-enabled status is relinquished. Relinquishing of talk-enabled status may be achieved by pressing a pre-selected key or sequence of keys, to send either data or DTMF tones, or additionally or alternatively, relinquishing may occur automatically following a given period of silence. Transfer of talk status is typically controlled by the $P^2T$ server 10. The decision as to which device to reward with talk status in the event of more than one device requesting talk status may be carried out using any one of a number of preferred algorithms. The most common anticipated algorithm is simply a rigid "first come first served" algorithm in which, until the session is released the system ignores requests to speak by other users. Then, on system release, talk status is simply passed to the first request that is received. However, numerous other possibilities may be used, for example the relinquishing talker may specify the next talker or certain users within the group may be given priority levels. Priority levels may, if desired, be used to provide certain users with the ability to cut in to another speaker, but more usually they provide priority over other users when a current talker relinquishes his status. In a preferred embodiment, talk status transfer is fully customizable by the user, and preferably the user is able to apply different customizations to different user groups. In a preferred embodiment the user is able to define a time limit be placed on how long a user may retain talk status. If desired it is possible to define a different time limit for different users in the group.

Figure 6:
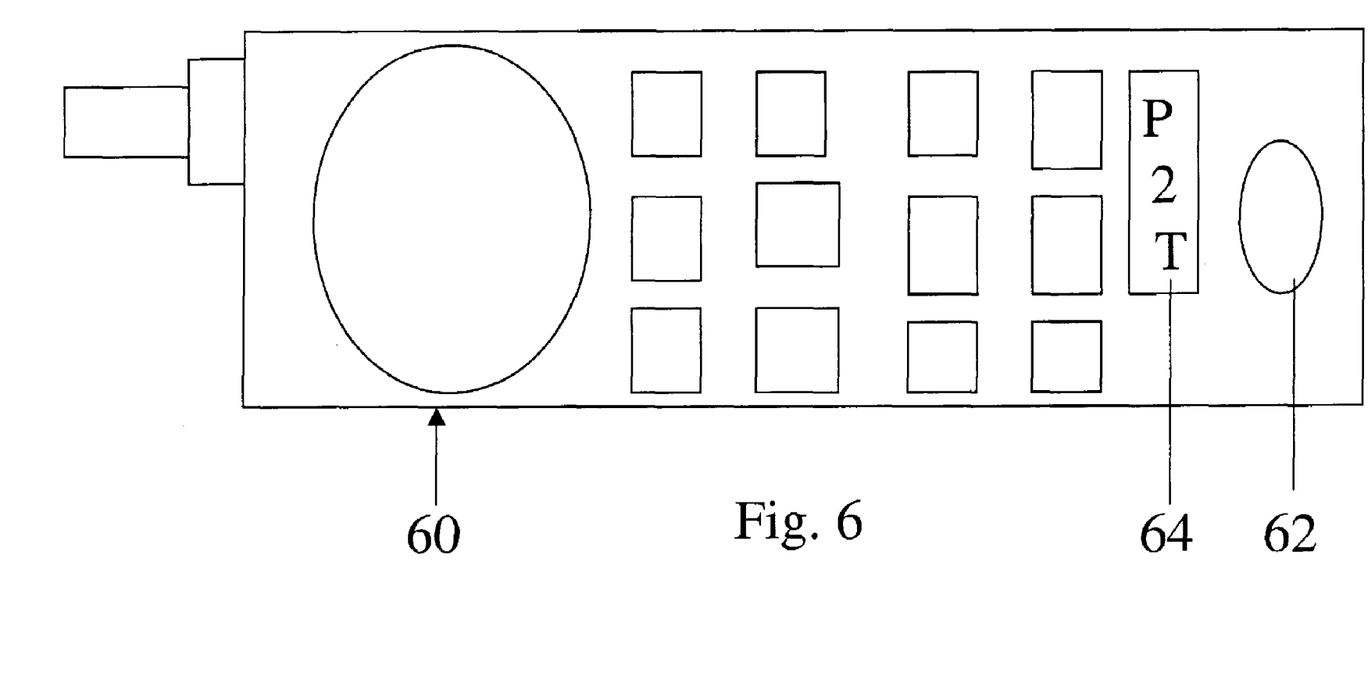
FIG. 6 is a simplified diagram showing a handset dedicated for use for multi-party sessions.

No special handset is required to participate in or initiate the $P^2T$ session, since the session simply utilizes the device's standard signaling capabilities and the network's IP communication ability. However, a dedicated handset may be used as shown in FIG. 6 which is a simplified schematic diagram of a mobile handset for dedicated multi-session use. A handset 60 is a standard mobile handset with the addition of a loudspeaker 62 for simulating the effect of a walkie-talkie radio, and a push-to-talk button 64 for requesting and relinquishing talk status. The dedicated handset 60 is preferably provided with software (not shown) which allows a voice message to be recorded upon session setup and sent to participating devices as they connect to the session. Typically, the feature is provided in recognition of the fact that certain participants are likely to connect to the session more quickly than others. As appreciated, not everyone answers the telephone immediately. The party initiating the session can record a welcome message for the session participants, which he sends just once but which each participant hears when he connects to the session. In one preferred embodiment, recording of the initial welcome is prompted by a screen icon or like multimedia item, and recording is completed when the user indicates, through interaction with the item, that the welcome message has been completed. In a further preferred embodiment, a period of silence is taken to indicate the end of a welcome message. In a third preferred embodiment a combination is provided in that a user interaction is taken as an explicit end to the welcome message, but in the absence thereof, a certain period of silence is taken as the default end of the welcome message. In a fourth preferred embodiment, the end of the welcome message may be indicated by relinquishing talk status in one of the ways indicated above.

For the session initiator, the ability to record a welcome message provides for a better user experience, since the user requests a session, and is immediately able to begin talking. In this way, the $P^2T$ server 10 receives the message as soon as a connection is available, and subsequently forwards the message to other users as the other users become available. Recording of the welcome message is a way of ensuring that each user gets to hear the welcome message, yet the initiator does not need to wait until everyone is connected before he starts to talk. Such a wait would be especially irritating for group members who connect up earlier, who would otherwise answer their phones and hear nothing.

As a further variation, the session may comprise a single recorded voice message, wherein the inviting party simply sets up the multi-party session, records a welcome message, and then ends the session. Such a feature constitutes one-to-many voice messaging.

Figure 7:
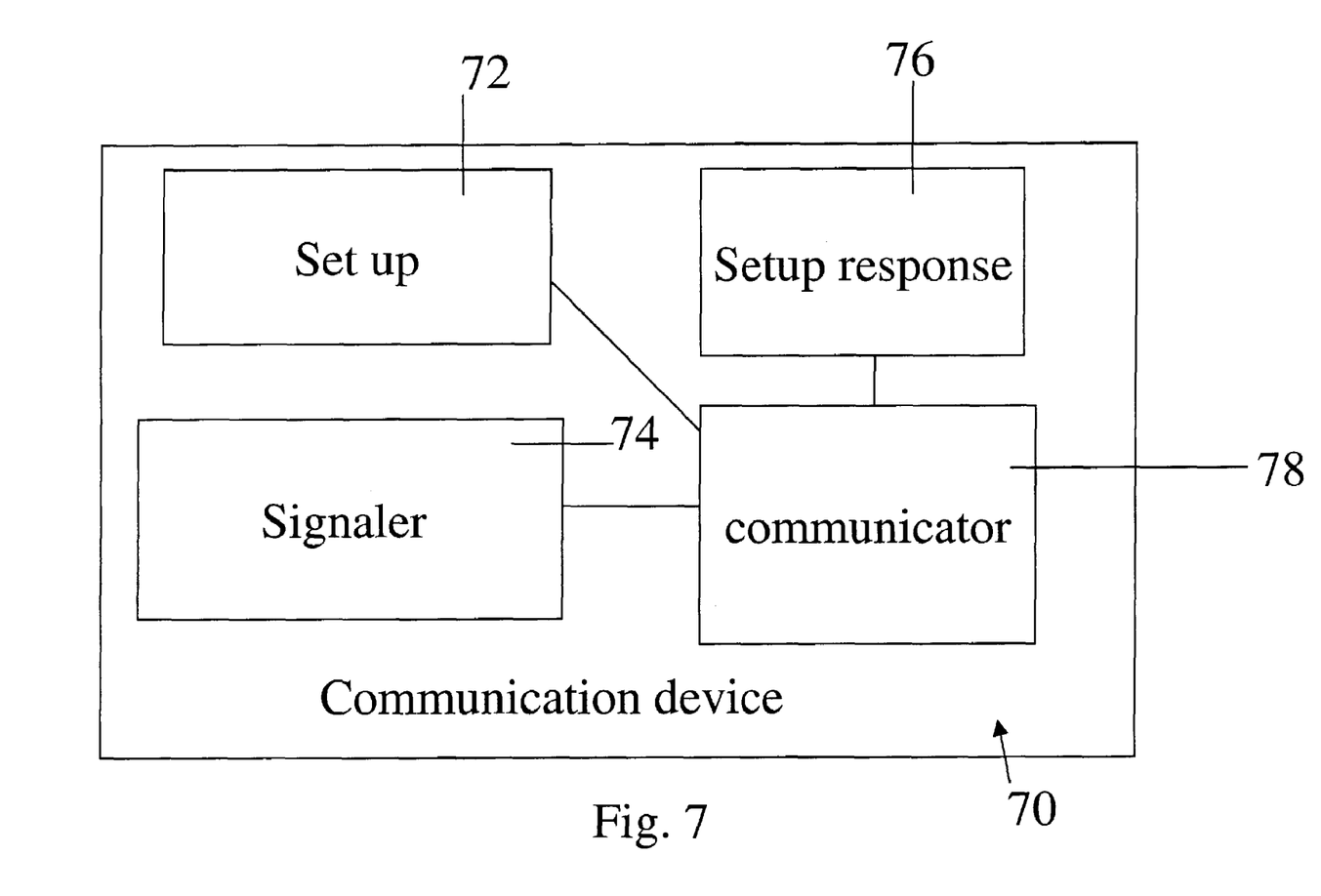
FIG. 7 is a simplified diagram showing the dedicated handset of FIG. 6, and indicating internal features thereof.

Reference is now made to FIG. 7 which is a simplified block diagram showing the internal structure of the dedicated communication device of FIG. 6. Dedicated communication device 70 comprises a setup unit 72 for sending a communication session set up signal to a communication gateway over a telephony network to set up a one-to-many communication channel and for specifying remote devices to participate in the session. The session setup signal may be a predetermined number or combination of a number and symbols from a standard telephone keypad. The device further comprises a set up response unit 74 for receiving a confirmation that the session has been set up. In addition there is provided a talk status signaler 76, associated with key 64 referred to in connection with FIG. 6, for allowing a user to request and relinquish talk status within the session. Each of the above features is associated with general communication functionality 78 of the communication device 70. It will be appreciated that a dedicated device may be programmed with software to support numerous aspects of one-to-many sessions. A simple conventional telephone device does not include a microprocessor, and thus, cannot be programmed in such a way. A standard mobile telephony device generally includes a microprocessor, and thus, can be provided with dedicated software, although such a standard device may lack the hardware features of the dedicated device 70.

Embodiments of the present invention provide the following further advantages. There is no need for expensive DSP conference modules/cards, mainly because no mixing of signals occurs. Thus, embodiments of the invention are cheaper to provide than conventional telephone conferencing equipment. Furthermore, since special hardware is not required, the embodiments consume less floor space and potentially provide higher numbers of simultaneous sessions. In the latter case, of conventional modules, the available specialized hardware introduces separate capacity limitations of its own, often both to the total number of sessions supported and to the numbers of parties that can be admitted to any individual session. With the present invention, it is in principle no more difficult to add parties to an individual session than it is to add additional destination addresses to e-mail messages. That is to say there is negligible capacity limitation to the number of participants in a single multi-party session. In this respect the reader is referred to the discussion in http://www.cisco.com/warp/public/614/17.html regarding capacity limitations, the contents thereof hereby being incorporated herein by reference.

A multi-party session according to the embodiments of the present invention is preferably a highly moderated half-duplex session as explained above, thereby generally rendering the voice signal clear and distinct, and thereby suitable, even for industrial and other less than ideal environments. Such is particularly an advantage over group radio sessions.

As described above, sessions according to the embodiments of the present invention may be set up on demand in real time and need minimal provisioning.

The multi-party sessions of the embodiments of the present invention have the following advantages over the iDEN Push-to-Talk service referred to in the background of the invention above:

1. the embodiments may be deployed in any wireless and wireline network, regardless of wireless standard or like factors, since the session uses the underlying IP ability of central infrastructure as illustrated in FIG. 2,
2. the embodiments may serve participants that cross over or roam from one network to another, and
3. the embodiments are capable of including, in a single session, devices connected over different networks.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. A communication session support infrastructure comprising:
    a networked packet-based connection unit, said connection unit comprising:
        a packet data interfacing unit configured to convert between a plurality of protocols used by communication devices and a packet-based protocol, and
        a one-to-many packet routing unit, associated with said packet data interfacing unit, configured to receive packets through said interfacing unit from a first communication device connecting to said support structure in a session based on a single IP address and routing said packets back through said interfacing unit to other communication devices in said session.
2. The infrastructure of claim 1, further comprising a session support unit, said session support unit connected packetwise to said packet-based connection unit and comprising a device designation unit configured to support dynamic designation of one of said communication devices in said session as a talk-enabled device and all other communication devices in said session as listening devices, such that said routing is from said talk-enabled device to each of said listening devices.

3. The infrastructure of claim 2, wherein each of said communication devices in said session is assigned an IP address defining a respective connecting port of said interfacing unit, and wherein said one to many packet routing unit is operable to set a session IP address, said session IP address being of a multicast IP address class, to thereby provide said routing to each respective connecting port.

4. The infrastructure of claim 2, wherein each of said communication devices in said session is assigned an IP address defining a respective connecting port at said interfacing unit, and wherein said one-to-many packet routing unit is operable to duplicate packets received from said sending device for respective IP addresses of each receiving device, thereby providing said routing to each respective connecting port.

5. The infrastructure of claim 1, wherein said packet data interface unit is operable to recognize that a communication device in said session uses a circuit switched voice format, and to convert between said recognized circuit switched voice format and voice over IP packet format.

6. The infrastructure of claim 1, wherein said packet data interfacing unit is operable to recognize that a communication device in said session uses a packet based format, and to forego converting said packet based format.

7. The infrastructure of claim 2, wherein said device designation unit comprises functionality for recognizing requests from communication devices in said session to be designated as talk-enabled devices.

8. The infrastructure of claim 7, wherein said device designation unit further comprises functionality for selecting between conflicting requests.

9. The infrastructure of claim 7, wherein said device designation unit comprises functionality for recognizing signals from sending devices indicating relinquishment of said talk-enabled designation.

10. The infrastructure of claim 7, wherein said device designation unit further comprises functionality for providing an alert to a communication device in said session to indicate that it has received said talk enabled designation.

11. The infrastructure of claim 10, wherein said alert is an audible signal.

12. The infrastructure of claim 10, wherein said alert is a code for sounding an audible signal in a remotely located communication device.

13. The infrastructure of claim 10, wherein said alert is a short messaging alert or a telephone ring.

14. The infrastructure of claim 10, wherein said alert is a multimedia alert.

15. The infrastructure of claim 1, further comprising a user database including communication devices available for connection to said communication sessions.

16. The infrastructure server of claim 15, wherein said user database further includes groupings of said communication devices.

17. The infrastructure of claim 16, further comprising a session setup functionality for allowing a first remote device to select at least one of said communication devices or said groups of said communication devices included in said database for connection to said communication session.

18. The infrastructure of claim 17, wherein said session setup functionality is operable to alert said communication devices for connection to said session.

19. The infrastructure of claim 18, wherein said alert is an audible signal.

20. The infrastructure of claim 18, wherein said alert is a code for sounding an audible signal in a remote device.

21. The infrastructure of claim 18, wherein said alert is one of a short messaging alert and a telephone ring.

22. A communication device, for supporting a one-to-many communication session, said session operating over telephony infrastructure and designating one device at any time in said session as a talk enabled device able to transmit signals and all other devices in said session as non-talk enabled devices unable to transmit signals, the communication device comprising:

a set up unit for sending a communication session set up signal to a communication gateway over a telephony network to set up a one-to-many communication channel and for specifying remote devices to participate in said session based on a single IP address, a set up response unit for receiving a confirmation that said session has been set up, and a talk status signaler for allowing a user to request and relinquish talk status within said session.

23. The communication device of claim 22, adapted for a mobile communication device.

24. The communication device of claim 22, adapted for a PSTN communication device.

25. The communication device of claim 22, wherein said setup signal is a predetermined number.

26. The communication device of claim 25, wherein said setup signal further comprises a selection code for selection of said remotely located devices.

27. A method of providing group communication over telephony infrastructure, the method comprising:

assigning a network IP address as a basis for a communication;

connecting a plurality of remotely located communication devices to said network IP address;

dynamically designating one of said remotely located communication devices as a talk device; and receiving data from said designated talk device at said network IP address and distributing said received data to each of the other communication devices.

28. The method of claim 27, wherein said assigning a network IP address is carried out in response to a request by a first communication device, and said first communication device is initially set as said talk device.

29. The method of claim 28, wherein subsequent dynamic designation of a talk device is carried out upon receipt from a current talk device of a talk-relinquishing signal.

30. The method of claim 27, further comprising detecting whether one of the communication devices is connecting using a circuit-switched voice format and, if so, converting between said circuit-switched voice format and a packet format.

31. The method of claim 30, further comprising performing one-to-many routing of data packets from said current talk enabled device to each other device.

32. The method of claim 27, wherein said telephony infrastructure comprises PSTN infrastructure, Internet infrastructure and cellular infrastructure.

* * * * *